M. E. KRANZ.
JIG FOR DRILLING VALVE CAGES.
APPLICATION FILED JAN. 14, 1920.
1,401,262.
Patented Dec. 27, 1921.
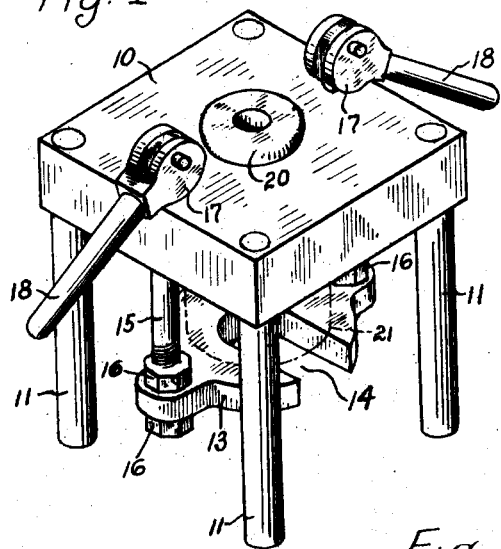
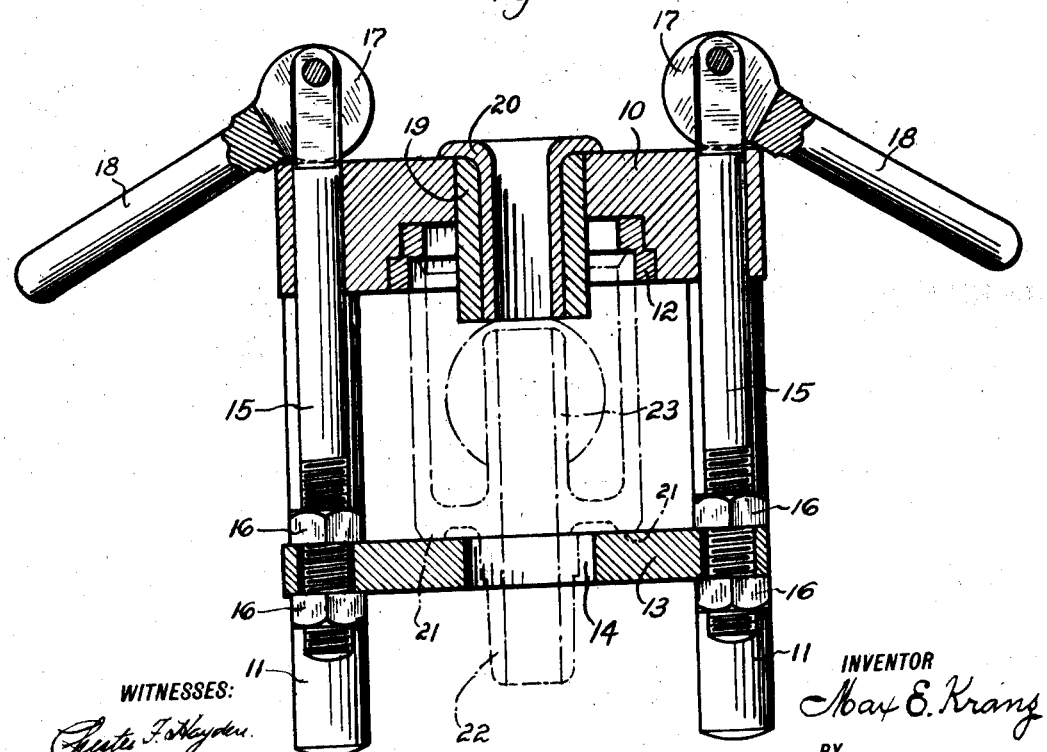
INVENTOR
Max E. Kranz
WITNESSES:
BY
ATTORNEY

UNITED STATES PATENT OFFICE.

MAX E. KRANZ, OF BRIDGEPORT, CONNECTICUT.

JIG FOR DRILLING VALVE-CAGES.

1,401,262. Specification of Letters Patent. Patented Dec. 27, 1921.

Application filed January 14, 1920. Serial No. 351,507.

*To all whom it may concern:*

Be it known that I, MAX E. KRANZ, a citizen of the United States, residing at 414 John St., Bridgeport, county of Fairfield, State of Connecticut, have invented an Improvement in Jigs for Drilling Valve-Cages, of which the following is a specification.

The object of the invention is to produce a novel jig of simple structure which will effectually hold valve cages in position for accurate drilling of their valve stem guides. The jig of the present invention is especially adaptable to the type of valve cages used in Buick automobiles.

The valve stem guides of valve cages are subjected to considerable wear in use and have to be frequently drilled out. Heretofore, in order to effect accurate drilling, it has been necessary that the valve cage be set up in a lathe, and this has consumed considerable time. The present invention provides a jig in which the valve cage can be quickly and properly inserted and clamped with the valve stem guide in position for accurate drilling.

With the above and other objects in view, the invention will now be fully described and hereinafter specifically claimed.

In the drawing forming a part of this specification,

Figure 1 is a perspective view of the novel jig; and

Fig. 2 is a transverse section thereof, showing in dotted lines a valve cage in position to be drilled.

10 indicates a top plate carried by legs 11. In its under face the top plate is provided with a recess to receive one end of a valve cage whose valve stem guide is to be drilled, and as there are several sizes of valve cages, provision is made to adapt the recess to the different sizes. In the present instance I have shown the recess adapted for two different sizes, and for this purpose I have provided a double diameter ring 12. A yoke 13 is provided to support the opposite end of the valve cage. The yoke is cut away as indicated at 14 to provide space for the passage of the valve stem guide when the valve cage is being inserted or removed. Two draw rods 15 which are screw threaded at their ends, carry the opposite sides of the yoke. Nuts 16 are provided for the screw threaded portions of the draw rods and are adapted to engage the upper and lower surfaces, respectively, of the yoke to insure its position. By means of the nuts, the yoke is adjustable upward and downward on the draw rods to accommodate the different sizes of valve cages and to seat the opposite ends of a cage firmly against the surface of the recess or double diameter ring in the top plate and the upper surface of the yoke, respectively, and thus aline its valve stem guide for accurate drilling. The draw rods pass through openings in opposite sides of the top plate, and at their upper ends they are provided with locking cams 17 having operating levers 18. Through the center of the top plate is an opening concentrically arranged with respect to the recess and double diameter ring, and concentrically mounted in this opening are bushings 19 and 20 for guiding the drill. An inner bushing having a bore of any desired size may of course be used to accommodate the different sizes of drills.

In dotted lines in Fig. 2 a valve cage is shown in position to be drilled. An end of the cage is firmly seated on the yoke, as indicated at 21, and an end 22 of valve stem guide 23 extends through the cut away portion of the yoke. The other end of the cage is firmly seated against the double diameter ring in the top plate, the levers are in the locking positions of the cams, and the valve stem guide is firmly clamped in accurate alinement with the opening in bushing 20 which guides the drill. When it is desired to release the cage, the levers are swung to the unlocking positions of the cams, and the yoke drops a sufficient distance to allow the drilled cage to be slid out of the jig, as will be readily understood. Another cage may now be slid in and clamped between the top plate and the yoke, as before.

What I desire to claim is:

1. A jig for holding valve cages, comprising a top plate provided with a recess in its lower surface and an opening through its center concentrically arranged with respect to said recess, said recess being provided with means to adapt it to different sizes of valve cages and said opening being provided with a bushing, a yoke having a cut away portion, and draw rods attached to said yoke and extending through said plate and provided with means for clamping a valve cage between the wall of said recess and the upper surface of said yoke.

2. A jig for holding valve cages, comprising a top plate provided with a recess in its lower surface and an opening through its center concentrically arranged with respect to said recess, said recess being provided with a double diameter ring adapting it to different sizes of valve cages and said opening being provided with a bushing, a yoke having a cut away portion, and draw rods adjustably attached to opposite sides of said yoke and extending through opposite sides of said top plate and provided with means for clamping a valve cage between the wall of said recess or double diameter ring and the upper surface of said yoke.

3. A jig of the character described, comprising a top plate and a yoke adapted to receive opposite ends, respectively, of a valve cage provided with a valve stem guide, said plate having therein a recess and an opening concentrically arranged with respect to said recess, said recess being provided with means to adapt it to different sizes of valve cages and said opening being provided with a bushing, and said yoke having a cut away portion through which said valve stem guide is adapted to extend, and draw rods adjustably attached to said yoke and extending through said plate and provided with locking cams having levers, whereby said yoke may be adjusted on said draw rods to accommodate different sizes of valve cages and to firmly seat the opposite ends of a valve cage between said means in said recess and the upper surface of said yoke when the levers are in the locking positions of the cams.

In testimony whereof I affix my signature.

MAX E. KRANZ.